May 15, 1956  D. J. SCHNEIDER ET AL  2,745,433
CONTROL VALVE FOR FLUID PRESSURE OPERATED MECHANISMS
Filed Feb. 25, 1952  3 Sheets-Sheet 1

Inventors
Dana J. Schneider
Francis H. Tennis

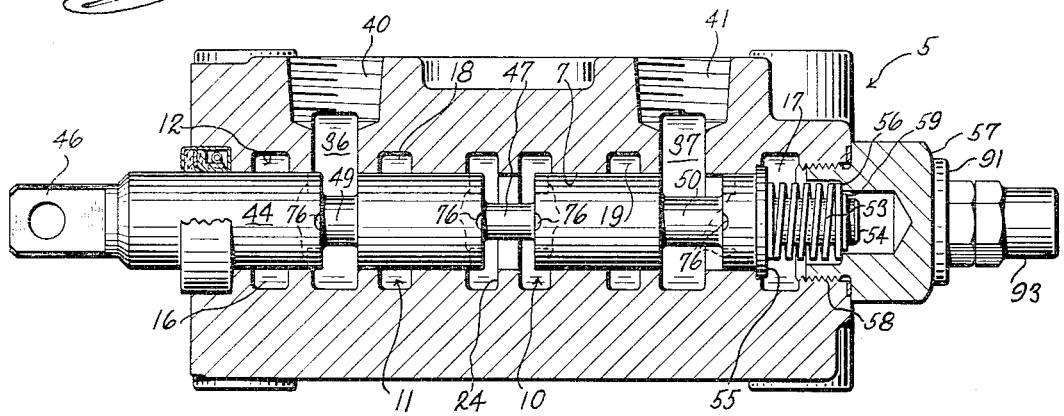
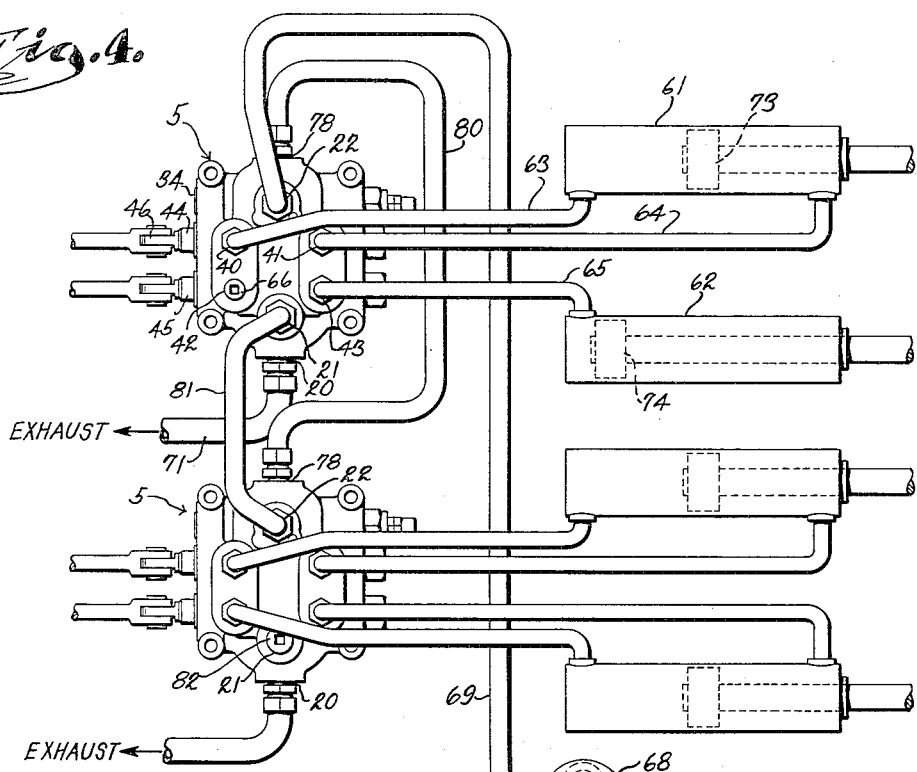
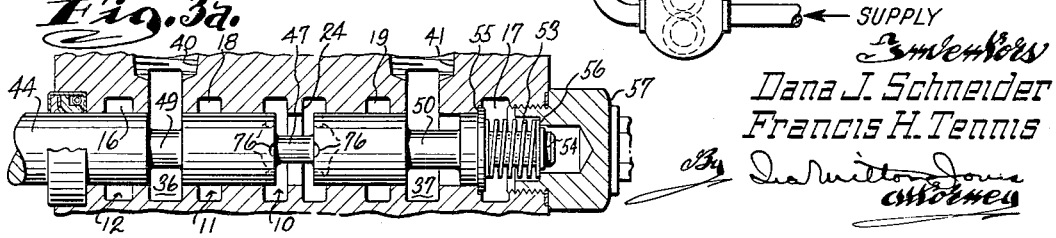

May 15, 1956  D. J. SCHNEIDER ET AL  2,745,433
CONTROL VALVE FOR FLUID PRESSURE OPERATED MECHANISMS
Filed Feb. 25, 1952  3 Sheets-Sheet 3
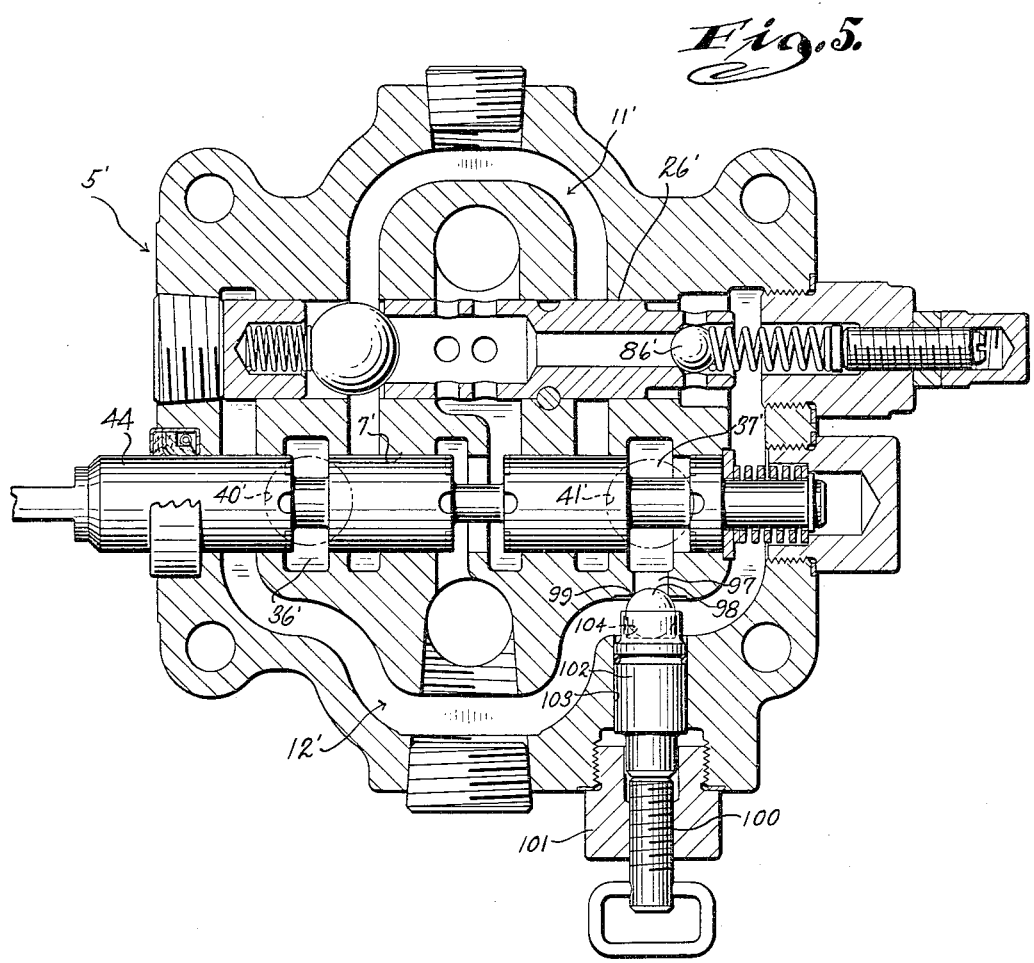
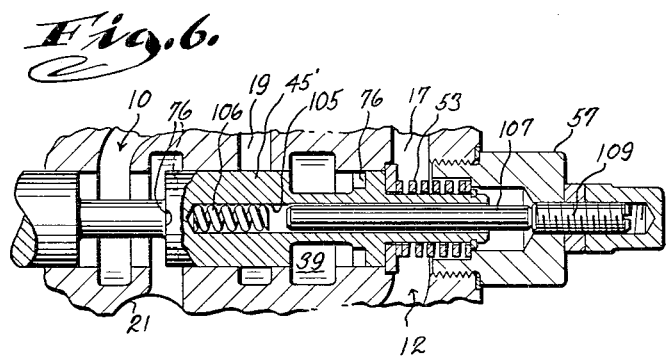
Inventors
Dana J. Schneider
Francis H. Tennis United States Patent Office 2,745,433
Patented May 15, 1956

2,745,433

CONTROL VALVE FOR FLUID PRESSURE OPERATED MECHANISMS

Dana J. Schneider, Waukesha, and Francis H. Tennis, Milwaukee, Wis., assignors to Hydraulic Unit Specialties Co., Waukesha, Wis., a corporation of Wisconsin Application February 25, 1952, Serial No. 273,202

6 Claims. (Cl. 137—621)

This invention relates to control valves and has more particular reference to improvements in control valves of the type employed to govern the operation of fluid pressure actuated mechanisms such as hydraulic cylinders or rams, or other hydraulic equipment.

In the past, control valves of this type were invariably designed for use with one particular type of hydraulic cylinder or the like, and consequently their construction depended upon whether they were to control the supply of fluid under pressure to one or more single acting hydraulic cylinders or rams or to one or more rams of the double acting type. An example of a control valve for controlling one single acting hydraulic cylinder is shown and described in Patent No. 2,546,565 issued to Dana J. Schneider, March 27, 1951. Other types of control valves for governing the operation of a plurality of single acting hydraulic cylinders and for governing the operation of a number of double acting cylinders are shown and described in Patent No. 2,244,213, issued to W. A. Patton, June 3, 1941.

While the control valves of the aforementioned patents have been referred to merely by way of example, they nevertheless can be said to be typical of the specialized construction of control valves heretofore available. In addition, control valves hitherto available for controlling a plurality of like cylinders or rams have been quite complicated and expensive.

The main objective of this invention is to provide an all purpose control valve of the character described which is not only unusually simple in construction but which is readily adaptable to almost any type of service, including the control of both single and double acting rams either in like groups or mixed. More specifically this invention features a control valve which has unusual versatility in that its movable valve element or elements are readily interchangeable to convert the control valve for service either with one or more hydraulic rams of the single acting type, one or more rams of the double acting type, or with rams of both the single and double acting type in a mixed group thereof.

Another purpose of this invention resides in the provision of an all purpose control valve which features simplicity of construction resulting chiefly from the fact that a single check valve is located in the body of the valve to serve all of the high pressure outlets of the valve and the hydraulic rams connected therewith. This, of course, is in comparison with the conventional construction wherein at least one check valve is provided for each pressure outlet of the control valve.

Still another objective resides in the standardization of the construction of the control valve of this invention to the degree where two or more similar valve units may be interconnected while physically separated from one another, and served by a common pump or other pressure source, to control several hydraulic rams or cylinders certain of which may be located remote from the others.

With the above and other objects in view, which will appear as the description proceeds, this invention resides in the novel construction and arrangement of parts substantially as hereinafter described, and more particularly defined by the appended claims, it being understood that such changes in the precise embodiment of the hereinafter disclosed invention may be made as come within the scope of the claims.

The accompanying drawings illustrate several complete examples of the physical embodiment of the invention constructed in accordance with the best modes so far devised for the practical application of the principles thereof, and in which:

Figure 3 is a sectional view taken through Figure 1 along the plane of the line 3—3;

Figure 3a is a view similar to Figure 3 but showing a slightly modified embodiment of the invention;

Figure 4 is an elevational view illustrating the manner in which two control valves of this invention may be connected together and fed from a common pressure source to control the operation of a battery of hydraulic rams of both the single and double acting type;

Figure 5 is a longitudinal sectional view of the control valve of this invention illustrating another embodiment thereof; and Figure 6 is a fragmentary sectional view corresponding to a portion of the valve shown in Figure 1 but illustrating a further modification thereof.

Referring now more particularly to the accompanying drawings in which like numerals designate like parts throughout the several views, the numeral 5 generally designates the casing or valve body for the control valve of this invention. The body, as shown in Figures 1 and 2, is substantially rectangular in outline and rather flat, that is, it has little depth.

Figure 1:
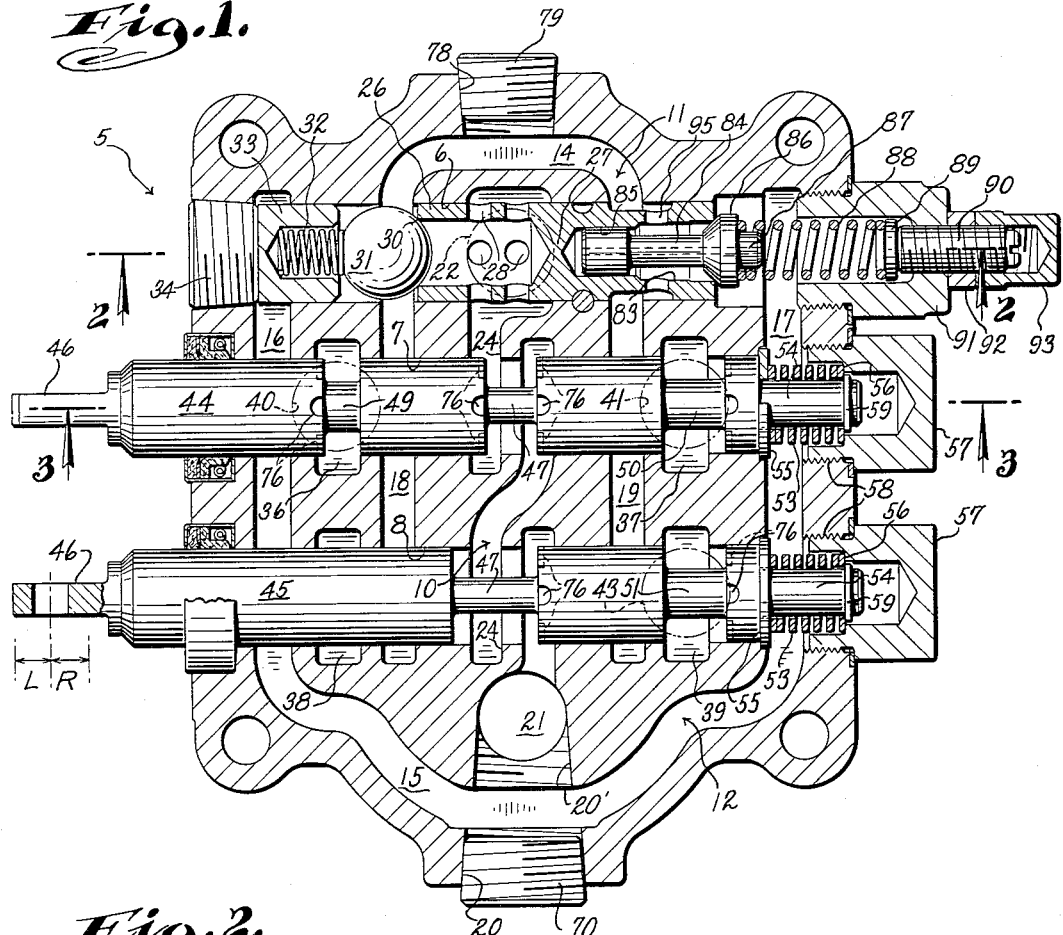
Figure 1 is a longitudinal sectional view through a control valve embodying the principles of this invention.
Figure 2:
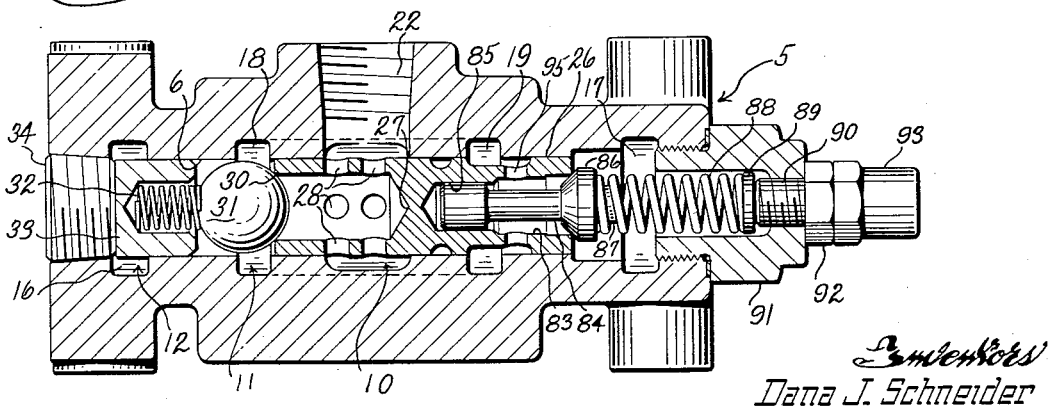
Figure 2 is a sectional view taken through Figure 1 along the plane of the line 2—2.

In the control valve of Figure 1, the body is provided with three spaced parallel transverse bores 6, 7 and 8, with the bores 6 and 8 near the top and bottom of the body, respectively, and the bore 7 substantially midway therebetween. The axes of all three bores lie in a common plane, and each of the bores intersects and communicates with a number of passages formed in the interior of the valve body and now about to be described.

There are three main passages in the body, namely, a central low pressure or through passage 10, a high pressure passage 11, and a relief passage 12. The high pressure and relief passages are substantially U-shaped with the bight 14 of the high pressure passage 11 directly adjacent to the top of the valve body and substantially parallel to the adjacent bore 6, and the bight 15 of the exhaust passage 12 extending transversely of the body adjacent to the bottom thereof a distance beneath the lowermost bore 8. The left and right branches 16 and 17 of the exhaust passage extend upwardly in the body adjacent to the opposite sides thereof to intersect and communicate with all three bores 6, 7 and 8. The left and right branches 18 and 19 of the high pressure passage 11 extend downwardly from the bight 14 thereof between the branches of the exhaust passage to intersect and communicate with all three of the bores in a manner similar to the branches 16 and 17 of the exhaust passage.

It will be seen, therefore, that the branches of the high pressure passage 11 are substantially embraced by the branches of the exhaust passage 12, and that the branches of both of these passages are parallel to each other while extending at right angles to the bores 6, 7 and 8, and that they also lie in a common plane containing the axes of the bores 6, 7 and 8.

The low pressure or through passage 10 extends downwardly in the body from the topmost bore 6, midway between the branches 18 and 19 of the high pressure passage, and opens to the bottom of the valve body through an exhaust port 20 after crossing the bight 15 of the exhaust passage 12. Thus, the low pressure passage 10, not only communicates with the exhaust passage, but also intersects all three bores 6, 7 and 8. Just ahead of the bight 15 of the exhaust passage, the low pressure passage also communicates with an alternate outlet port 21 opening to the front of the valve body. While the upper end of the low pressure passage 10 terminates at the bore 6, it has communication with an inlet port 22 opening to the front of the valve body.

Attention is directed to the fact that with the type of valve shown in Figure 1 the low pressure or through passage 10 actually comprises a series of laterally adjacent passages extending between each adjacent pair of bores and having their ends overlapping at the vicinities of the bores 7 and 8 but separated from one another at these areas by baffle-like walls 24. The bores 7 and 8, of course, extend through these baffle walls 24 to communicate the overlapping ends of the laterally adjacent sections of the low pressure passage so that they form one continuous through passageway leading from the inlet to either of the outlet ports 20 or 21 as long as the control valve is in a neutral position to be defined later.

Fixed in the bore 6 in any suitable manner is a sleeve 26 having a transverse partition 27 medially of its ends. The partition is located just to the right of the upper, inlet end of the low pressure or through passage 10 and the left hand end of the sleeve terminates inside the bore 6 substantially at its intersection with the branch 18 of the high pressure passage. A series of holes 28 drilled in the wall of the sleeve substantially in line with the inlet port 22 provide for communication between the inlet port and the interior of the left hand end of the sleeve so that fluid delivered to the valve body as by means of a pump connected with the inlet port 22 may flow downwardly into the low pressure passage 10 as well as to the left in the sleeve toward the left branch 18 of the high pressure passage 11.

The extremity of the sleeve which terminates adjacent to the branch 18 of the high pressure passage provides a seat 30 for a ball check valve 31 positioned in the junction between the bore 6 and the branch 18 of the high pressure passage 11. The ball 31 is yieldingly held in engagement with the seat 30 by a compression spring 32 confined between the ball 31 and the bottom of a well in an insert 33 in the bore 6. The insert 33, of course, is retained in the bore by a plug 34 threaded into the mouth of the bore 6 at the left side of the valve body.

With this construction it will be noted that while the sleeve 26 connects the branch 18 of the high pressure passage with the inlet end of the low pressure or through passage 10, it may be considered as providing, in effect, a portion of the branch 18 of the high pressure passage serving to connect the same with the inlet port 22.

Substantially medially between each branch 16 and 17 of the exhaust passage and the adjacent branches 18 and 19, respectively, of the high pressure passage, the bores 7 and 8 are enlarged radially to provide pressure wells 36 and 37 respectively communicating with the bore 7, and 38 and 39 respectively communicating with the bore 8. High pressure ports 40 and 41 opening to the front of the valve body communicate with the pressure wells 36 and 37 respectively, and similar high pressure ports 42 and 43, of course, communicate with wells 38 and 39 respectively for the bore 8.

These high pressure ports are connectible with fluid pressure operated mechanisms to be controlled by the valve, and each is communicable through its pressure well and its bore with one or the other of the branches 18 and 19 of the high pressure passage 11. Communication between the pairs of pressure wells and the branches 18 and 19 of the high pressure passage is controlled by valve elements 44 and 45 slidably fitting the bores 7 and 8, respectively, and each having an end 46 projecting from the valve body for connection with an actuating lever or the like by which the valve elements may be reciprocated in their bores. Both valve elements are shown in their neutral positions in Figure 1, at which an annular groove 47 in each substantially medially between its ends aligns with the low pressure or through passage to clear the same for the free flow of fluid therethrough.

By way of illustration, the valve element 44 may be of the double acting type. This means that it is designed to control the operation of a double acting hydraulic ram or the like, while the valve element 45 may be of the single acting type for controlling a single acting hydraulic cylinder or ram. For this reason the valve element 44 has two additional annular grooves 49 and 50 therein which align axially with the pressure wells 36 and 37 respectively, in the neutral position of the valve element shown in Figure 1. The valve element 45, however, has only one additional annular groove 51 aligning axially with the pressure well 39 in the neutral position of the valve element shown, since only the high pressure port 43 communicating with the pressure well 39 is to be connected with the hydraulic ram. The other high pressure port 42 which communicates with the well 38 is fitted with a pipe plug to close the same.

Each of the valve elements 44 and 45 is yieldingly held in its neutral position shown by a coiled compression "centering" spring 53 encircling a turned down portion 54 of the valve element remote from its end 46, and having one end bearing against a washer 55 loosely received on the inner end of the turned down portion. The other end of the spring bears against the bottom 56 of a counterbore in a hollow cap 57 threaded into a hole 58 in the adjacent side of the valve body. Since the shoulder defined by the bottom 56 of the counterbore may be considered fixed with respect to the valve body, while the washer 55 bears against the inner side of the stretch 17 of the exhaust passage 12, each of the springs 53 is held under a degree of compression.

The full diameter ends of the valve elements normally bear against the inner sides of the washers 55 so that when the valve elements are moved to the right, as seen in Figure 1, the washers 55 are propelled outwardly with the valve elements to further compress the springs 53, so that they thus yieldingly resist such movement of the valve elements. The engagement of spring rings 59 snapped into grooves (not shown) near the extremities of the turned down portions 54 of the valve elements with the outer ends of the centering springs cause the latter to be compressed upon movement of the valve elements to the left in their bores, so that such movement is likewise yieldingly resisted by the springs 53. The result is that the springs 53, by means of the arrangement described, effect centering of the valve elements to yieldingly hold the same in their neutral positions shown in Figure 1.

While other means may be provided to limit endwise sliding motion of the valve elements in their respective bores, the springs 53 in the present instance provide limiting means for this purpose. For this reason the springs are coiled from flat wire stock and the spacing of their convolutions is such that when the springs are fully closed by movement of the valve elements in one direction or the other, further motion of the valve elements is precluded.

By way of illustration it may be assumed that the extent of motion permitted for each of the valve elements corresponds to the dimensions L and R shown in connection with the valve element 45 of Figure 1.

Reference may be had to Figures 1 and 4 for a better understanding of the operation of the control valve of this invention. As seen in the upper half of Figure 4 the control valve 5 is shown operatively connected to two hydraulic rams, the upper ram 61 being of the double acting type and the lower ram 62 being of the single acting type. Ducts 63 and 64 connect the opposite ends of the double acting ram 61 with the high pressure outlet ports 40 and 41 governed by the valve element 44; while only one end of the single acting ram 62 is connected by a duct 65 with the high pressure outlet 43 governed by the single acting valve element 45. The high pressure outlet 42, of course, is closed by a plug 66.

Fluid under pressure may be supplied to the control valve by means of a pump 68 for example, having its outlet connected by a duct 69 with the low pressure inlet 22 of the valve. Assuming that the exhaustive port 20 is closed by a plug 70, the alternate exhause port 21 may be connected by a duct 71 with the fluid reservoir.

In order to effect extension of the piston 73 of the double acting ram 61, fluid under pressure must be introduced into the ram through the duct 63 connecting the same with the high pressure outlet port 40 governed by the double acting valve element 44. To accomplish this, the valve element 44 is actuated to the right (as seen in Figure 1) to establish communication between the branch 18 of the high pressure passage and the well 36 with which the high pressure outlet 40 connects, and to close off the bore in the partition 24 of the low pressure passage and thus block the free travel of fluid through the passage. At the same time communication is established between the well 37 at the other end of the valve element and the adjacent branch 17 of the exhaust passage 12.

With the valve element 44 actuated to the right in this manner fluid pressure builds up in the inlet end of the through or low pressure passage 10 and the passage afforded by the end of the sleeve 26 normally closed by the ball check valve 31 to unseat the valve against the bias of its spring 32. Hence, this pressure is manifested in both branches 18 and 19 of the high pressure passage 11 and in the pressure well 36 and its high pressure outlet 40 so that fluid under pressure will flow out of the port 40 and through the duct 63 into the hydraulic ram 61 to cause extension of the piston 73 thereof. The fluid ahead of the piston 73, of course, is exhausted from the ram through the duct 64 and enters the valve body through the port 41 from which it flows into the well 37 and into the adjacent branch 17 of the exhaust passage 12 for return to the fluid reservoir.

As soon as the valve element 44 is released its centering spring 53 returns it to the neutral position shown, closing off communication between both ends of the ram 61 and the interior of the valve body, and again allowing fluid to pass freely through the low pressure passage 10. It should be observed that at this time the pressure in the through passage 10 is insufficient to overcome the force of the spring 32 acting on the ball check valve 31 so that the check valve closes as soon as the low pressure passage 10 is opened by return of the valve 44 to its neutral position. Consequently even though communication is disrupted between the high pressure well 36 and the adjacent branch 18 of the high pressure passage to preclude fluid backing out of the ram 61 under the influence of a load upon its piston 73, the ball check valve 31 positively closes off the high pressure passage from the inlet end of the low pressure or through passage 10 to preclude fluid which might leak past the valve element 44 from reaching the low pressure passage for discharge to the fluid reservoir.

To effect retraction of the piston 73 of the ram 61 the valve element 44 is actuated to the left to again close the low pressure passage and establish communication between the wells 36 and 37 and the branches 16 and 19 of the exhaust and high pressure passages, respectively. The fluid beneath the piston 73 is, therefore, free to exhaust through the duct 63, outlet port 40 and the well 36 into the adjacent branch 16 of the exhaust passage 12 to the fluid reservoir; while fluid under pressure is forced into the ram 61 ahead of the piston 73 by fluid under pressure flowing past the ball check valve 31 into the branch 19 of the high pressure passage 11, through the bore 7 and the well 37 into the duct 64.

When the piston has been retracted to the desired extent the valve element 44 is released for return to its neutral position by the centering spring 53 to re-open the low pressure passage 10 and consequently effect re-closure of the ball check valve 31 in the manner described to again close off both outlet ports 40 and 41 from the branches of both high and low pressure passages.

The control of the single acting ram 62 by the valve element 45 takes place in a similar manner. To effect extension of the piston 74 of the ram 62, the valve element 45 is actuated to the left from its position seen in Figure 1. This closes the bore in the partition 24 of the low pressure passage 10 to thus cause the pressure of fluid delivered to the inlet end of the low pressure or through passage to build up sufficient to unseat the ball check valve 31 and to flow down the branch 19 of the high pressure passage into the well 39 then communicated therewith and into the port 43 for delivery to the ram 62 by means of the duct 65. When the piston 74 of this ram has been extended to the desired distance the valve element 45 is released so that its centering spring 53 will return it to the neutral position shown.

It is highly important to note that the re-opening of the low pressure passage 10 by the return of the valve element 45 to its neutral position substantially collapses the pressure in the inlet end thereof so that the spring 32 effects thorough closure of the ball check valve 31 to assure against leakage of fluid out of the ram 62 from beneath its piston 74. In other words a single ball check valve 31 controlling communication between the inlet end of the low pressure passage 10 and the high pressure passage 11 is all that is required despite the fact that the control valve contains a plurality of valve elements for governing a plurality of hydraulic cylinders or rams or other fluid pressure operated mechanisms.

The placement of the check valve at the location defined makes it possible to use a single check valve in a control valve having any desired number of valve elements for controlling a like number of hydraulic rams or other fluid pressure operated mechanisms. This, of course, simplifies the control valve of this invention by the elimination of those check valves which have been conventionally used in each outlet port of previous control valves for the same purpose.

It should be observed also that the control valve of Figure 1 has been shown with one double acting valve element and one single acting valve element merely by way of illustration. Both valve elements may be either of the single or double acting type; and it will be appreciated that while only two valve elements have been illustrated as many valve elements as is required for the control of a like number of fluid pressure operated mechanisms may be incorporated in a single valve body with a single check valve assuring against backing up of fluid from the mechanisms under control through the valve passages to the low pressure passage 10.

If desired, diametrically opposite pairs of radial grooves 76 of different axial depths may be cut into the portions of the valve elements defining the axial ends of the annular grooves 49, 50 and 51 to effect throttling of the flow of fluid therethrough and finer control over the motion of the pistons 73 and 74 of the rams 61 and 62, respectively. These grooves, however, may be eliminated as shown in Figure 3a to obtain maximum flow through the outlet ports, if desired.

It is highly desirable, however, that similar grooves 76 be cut into the portions of the valves defining the axial ends of the annular groove 47 so as to effect a very gradual closure of the low pressure passage 10 whenever the valve elements are actuated out of their neutral positions. By assuring gradual closure of the low pressure passage, shocks which might lead to damage in the system are eliminated.

In the case of the single acting valve element 45 the grooves 76 need only be cut into the valve element at the right end of the annular groove 47, and this annular groove preferably has greater axial length than the corresponding groove of the valve element 44 so that the low pressure passage is never closed by the valve element 45 during actuation thereof to the right.

The control valve of this invention is so designed that two or more of them may be connected together in a bank and fed from a common pump or other source of fluid under pressure. For this purpose the valve body has a threaded hole 78 therein extending into the top of the body and communicating with the bight 14 of the high pressure passage 11. This hole is normally closed by a plug 79, but the plug is removed when two or more of the control valves are connected together as shown in Figure 4, and a duct 80 having its ends secured in the holes 78 of both control valves communicates their high pressure passages 11 with one another.

Also as shown in Figure 4, the alternate outlet port 21 of the valve unit which is connected with the pump 68 is connected by a duct 81 with the low pressure inlet port 22 of the second valve unit which in turn has its alternate outlet port 21 closed by a plug 82.

With the arrangement shown in Figure 4 the alternate outlet port 21 of the top control valve is closed off from the bight end of the exhaust passage 12 by means of a plug (not shown) inserted through the outlet 20 and threaded into a hole 20' which normally connects the alternate outlet port 21 with the bight end 15 of the exhaust passage.

Accordingly, fluid from the pump flows serially through the low pressure passages 10 of both control valves for discharge to the fluid reservoir. Also by way of example, the lower control valve of Figure 4 is shown provided with ducts connecting each pair of its outlet ports with the opposite ends of a double acting hydraulic cylinder or ram. The lower valve is, of course, in all respects the same as the upper valve, but it has two valve elements 44 therein rather than one single acting and one double acting valve element as shown in Figure 1. It is understood, of course, that these valve elements are readily interchangeable with one another, all being the same diameter.

Again referring to Figure 1, it will be noted that the end of the sleeve 26 which opens to the upper end of the branch 17 of the exhaust passage 12 forms a convenient chamber 83 for a relief valve. The relief valve has its stem 84 in the chamber 83 and guided for motion coaxially of the sleeve in a well 85 in the inner end of the chamber, and has a head 86 on the outer end of its stem which engages the adjacent extremity of the sleeve in a manner similar to the ball check valve 31. The head 86 of the relief valve also has a projection 87 on its exterior encircled by one end of a comparatively heavy compression spring 88. This spring is confined under compression between the head 86 of the valve and a washer 89 adjustably held by an adjusting screw 90 in any desired axial position in the hollow interior of a cap 91 similar to the caps 57 and in which the screw is threaded. A lock nut 92 threaded onto the outer projecting end of the adjusting screw secures the latter in any desired position of adjustment, and the extremity of the screw is preferably covered by another cap 93 to discourage unauthorized tampering with the adjustment of the spring 88.

The spring 88, as stated, is substantially heavy and has considerably more force than the spring 32 for the ball check valve 31. In other words its holds the relief valve 86 closed against the pressure of fluid admitted into the relief valve chamber from the high pressure passage 11 through apertures 95 in the wall of the sleeve 26, but opens in the event unusually high pressures occur in the hydraulic system to prevent damage thereto.

Figure 5 shows another embodiment of the invention wherein the valve body 5' is provided with a single valve element 44 of the double acting type, slidable in opposite directions in a bore 7'. The high pressure and exhaust passages as well as the low pressure passage are arranged with the same symmetry as in the Figure 1 embodiment.

In Figure 5, however, the valve 5' may be quickly converted for the control of a single acting hydraulic ram or cylinder without the exchange of valve elements merely by closing a branch passage 97 communicating the high pressure well 37' with the bight end of the low pressure passage 12'. This may be easily effected through the provision of a ball 98 in the bight end of the exhaust passage 12' which may be forced into engagement with a seat 99 provided by the junction of the branch passage 97 with the bight end of the exhaust passage 12' as by means of a screw 100. The screw is conveniently threaded into a cap 101 on the bottom of the valve body and presses against a plunger 102 slidable in a bore 103 in the body aligning axially with the branch passage 97. The cap 101 likewise has a screw threaded connection with the bottom of the valve body, and the inner end of the plunger 102 has a short bore 104 therein to receive the ball 98 while allowing slightly less than half the ball to project from the bore for engagement with its seat 99.

With the control valve of Figure 5, both high pressure outlet ports 40' and 41' may be connected to the opposite ends of a double acting ram and the bypass branch 97 closed by the ball 98 to effect control of the motion of the piston of the ram in both directions by the valve element 44. If the load on the piston of the valve is such that the piston can be retracted satisfactorily by the load alone, as is the case with a single acting cylinder, the screw 100 is backed out a short ways to allow the ball 98 to drop from engagement with its seat 99.

Upon shifting of the valve element to the left with the passage 97 open, fluid in the high pressure passage 11' may flow into the high pressure well 37' and the by-pass branch 97 directly into the exhaust passage 12' rather than into the hydraulic ram through the port 41'. With such actuation of the valve element 44 the load will retract the piston and the fluid therebeneath will exhaust through the pressure well 36' and the bore 7' into the left branch of the exhaust passage 12'. The valve of Figure 5 is also readily adaptable for use with a single acting hydraulic ram by connecting only the outlet port 40' with the lower end of the ram and plugging the remaining outlet port 41'. In this event, the by-pass 97, of course, is opened.

It will also be readily appreciated that a control valve such as is shown in Figure 1 having two double acting valve elements 44 therein can readily be provided with the by-pass control described in connection with the Figure 5 embodiment to enable use of the lower valve element for the control of a ram either of the double or single acting type.

The control valve of Figure 5, as stated, is in its other respects similar to that of Figure 1 with the exception that the sleeve 26' is open throughout its length, that is, it has no partition intermediate its ends. The relief valve 86' in this case may be a ball, engaging a seat inside the sleeve and facing the right branch of the exhaust passage, to be unseated by excessive pressure in the high pressure passage or the inlet end of the low pressure passage itself.

With the embodiment of the invention shown in Figure 6, which it will be noted, corresponds to the right hand end of the lower valve element shown in Figure 1, very accurate control may be had over the lowering of the piston of a single acting hydraulic cylinder or ram. As herein shown, the right hand end of the valve element 45' has a small axial bore 105 therein and a heavy compression spring 106 is confined in the bottom of the bore. Slidably received in the outer end portion of the bore is a pin 107 having a length such as to extend beyond the adjacent end of the valve element and into the hollow interior of the cap 57' for engagement with the inner extremity of an adjusting screw 109 threaded into the cap so as to be accessible for adjustment from the exterior of the valve body. The lengths of the pin and spring 106 are such as to allow movement of the valve element 45' to the right in its exhaust stroke the distance necessary to effect initial exhausting of fluid from the single acting cylinder governed thereby before the spring 106 is compressed between the bottom of the bore 105 and the pin 107.

This motion of the valve element, of course, is yieldingly resisted by its centering spring 53. Upon further motion of the valve element in its exhaust stroke, the resistance of the heavy compression spring 106 is added to that of the centering spring 53 to substantially increase the force necessary to move the valve element toward a free exhaust position.

With this form of control valve, an operator wishing to effect lowering of the piston of a hydraulic cylinder governed thereby encounters only the lighter resistance of the centering spring 53 in shifting the valve element to its position at which the piston begins to lower, and he can then carefully regulate the rate of descent of the piston with the resistance of the heavy spring 106 acting against any sudden shifting of the valve by the operator which would cause too rapid descent of the piston.

From the foregoing description it will be apparent to those skilled in the art that this invention provides an all purpose control valve which is readily adaptable for many different types of service and which features simplicity of construction and a minimum of parts.

What we claim as our invention is:

1. A control valve of the character described, comprising: a valve body having an inlet and an outlet therein and a single elongated substantially centrally located through passage extending through the body and connecting the inlet with the outlet, said through passage being at all times communicated with the inlet, said body having an outer passage therein leading to an exhaust port and having branches thereof in spaced parallel and coplanar relationship with the through passage but disposed at opposite sides thereof, said body having an inner passage communicating with the inlet end of the through passage to provide in effect a part of the latter, said inner passage having branches thereof in spaced substantially parallel and coplanar relationship with the through passage and said branches of the outer passage, with each branch of the inner passage disposed between the through passage and one branch of the outer passage, said body having a bore therein with its axis in the plane of said branches of the inner and outer passages and the through passage and the bore intersecting the same at locations a distance downstream from the inlet end of the through passage, and the body having a pair of high pressure outlet ports each leading into the bore at a location between one branch of the outer passage and the adjacent branch of the inner passage, said high pressure outlet ports being communicable with the branches of the inner and outer passage adjacent thereto through said bore; a valve element slidable endwise in said bore from a neutral position clearing the through passage for the travel of fluid therethrough and closing off communication between said high pressure outlets and the adjacent branches of the inner and outer passages, to an operative position in which said valve element blocks off the through passage and connects one of the high pressure outlets with the adjacent branch of the inner passage and the other high pressure outlet port with the adjacent branch of the outer passage; and a check valve in said inner passage upstream from said bore for closing off communication between the inner passage and the body inlet whenever the valve element is in a neutral position clearing the through passage for the travel of fluid therethrough, said check valve being arranged to open in response to the build up of pressure in the inlet end of the through passage resulting from closure of the through passage by the valve element.

2. The control valve set forth in claim 1 wherein said exhaust port into which the outer passage leads constitutes said outlet of the valve body.

3. The control valve set forth in claim 1 further characterized by the fact that the body has a duct therein communicating one of said high pressure outlet ports with said outer passage; and means on the valve body accessible at the exterior thereof for controlling communication between said high pressure outlet port and the outer passage through said duct so that said high pressure outlet port may be by-passed by fluid whenever the valve element is in a position communicating the said high pressure outlet port with the adjacent branch of the inner passage and the duct is open to communicate said high pressure outlet port with the outer passage.

4. A control valve comprising: a valve body having a bore, an inlet, an outlet, a single through passage at all times communicating with the inlet and normally unrestrictedly connecting the inlet with the outlet, said through passage intersecting the bore at a location spaced a distance from the body inlet, a branched passage connecting with said through passage at a location between the bore and the body inlet and having spaced branches leading to said bore at zones thereof spaced from the junction of the bore and the through passage, said body having a high pressure outlet adjacent to each branch of said branched passage and communicable therewith through said bore; a valve element in said bore movable from a neutral position closing off communication between said high pressure outlets and the adjacent branches of the branched passage but clearing the through passage, to an operative position communicating one of said high pressure outlets with the adjacent branch of the branched passage and in which a portion of the valve element blocks off the through passage to constrain fluid entering the inlet to flow through the branched passage to said high pressure outlet; a check valve in said branched passage between the body inlet and the junctions of the branches of the branched passage with said bore, said check valve normally closing the branched passage at a location upstream from said high pressure outlets but being arranged to open in response to the flow of fluid from the inlet into the branched passage which results from closure of the through passage by the valve element; means in the valve body defining a by-pass duct extending between the body outlet and a portion of said bore which is common to said one high pressure outlet and the adjacent branch of the branched passage; and valve means on the body having an actuator accessible at the exterior thereof providing for opening and closing said by-pass duct.

5. In a control valve: a valve body having a bore to slidably receive a valve element, and having an inlet connectible with a source of fluid under pressure, a single through passage of substantially large cross section at all times communicated with the inlet and crosswise intersecting said bore, said through passage leading to an outlet port and normally freely conducting fluid entering the body inlet to said outlet port, a pair of high pressure outlets leading to said bore at zones spaced from one another axially of the bore and from the zone of intersection between the through passage and the bore, and exhaust passage means separate from the through passage and communicating with the bore near the zones of communication between the bore and said high pressure outlets, said body having supply passage means therein leading from the body inlet to said bore to communicate the inlet with both high pressure outlets through the bore; a valve element slidable axially in the bore in opposite directions from a neutral position at which the through passage is open across the bore but communication between both high pressure outlets and said supply and exhaust passage means is blocked, to an operative position communicating one of said high pressure outlets with said supply passage means and the other high pressure outlet with the exhaust passage means, and in which operative position the through passage is blocked off to constrain fluid entering the body inlet to flow only through said supply passage means to the high pressure outlet then communicated therewith; and a single check valve in said supply passage means to serve both high pressure outlets, said check valve being arranged to normally close said supply passage means and to open in response to the flow of fluid from the inlet through said supply passage means whenever the valve element is in either of its operative positions.

6. In a control valve: a valve body having an inlet connectible with a source of fluid under pressure, and having an outlet; means providing a through passage in the valve body having one portion thereof at all times communicated with the body inlet, said through passage leading to the body outlet and having a substantially large cross-section so as to be capable of freely conducting to the body outlet all fluid entering the body inlet; the valve body having a bore crosswise intersecting the through passage at a location downstream from the body inlet, and the body having a pair of high pressure outlets therein leading to the bore at zones spaced from one another axially of the bore and from the junction between the through passage and the bore; said body having exhaust passage means therein separate from the through passage and connecting with the bore to be communicable with the high pressure outlets through the bore; said body having supply passage means therein connecting with the body inlet and leading to said bore to be communicable with the high pressure outlets through the bore; a valve element slidable axially in said bore in opposite directions from a neutral position at which the valve element leaves the through passage open across the bore but closes off the high pressure outlets from both the supply and exhaust passage means, to an operative position communicating one of said high pressure outlets with the supply passage means and the other high pressure outlet with the exhaust passage means, and in which operative position the valve element closes the through passage at its junction with the bore to constrain fluid entering the body inlet to flow through said supply passage means to the high pressure outlet then communicated with the supply passage means; and normally closed check valve means in the valve body to govern said high pressure outlets, said check valve means permitting fluid to flow from the supply passage means through either high pressure outlet communicated therewith but precluding the flow of fluid from either high pressure outlet to the supply passage means.

References Cited in the file of this patent

UNITED STATES PATENTS

| | | |
|---|---|---|
| 2,247,140 | Twyman | June 24, 1941 |
| 2,247,141 | Twyman | June 24, 1941 |
| 2,343,689 | Mercier | Mar. 7, 1944 |
| 2,477,669 | Stephens | Aug. 2, 1949 |
| 2,489,435 | Robinson | Nov. 29, 1949 |
| 2,586,932 | Gardiner | Feb. 26, 1952 |